(12) United States Patent
May

(10) Patent No.: US 6,233,507 B1
(45) Date of Patent: May 15, 2001

(54) ECCENTRIC CONFORMANCE, SATELLITE-POSITION DETERMINATION MODULE

(76) Inventor: Douglas H. May, 658 E. 3525, North Ogden, UT (US) 84414

( * ) Notice: Subject to any disclaimer, the term of this patent is extended or adjusted under 35 U.S.C. 154(b) by 0 days.

(21) Appl. No.: 09/238,830

(22) Filed: Jan. 28, 1999

Related U.S. Application Data

(60) Provisional application No. 60/072,810, filed on Jan. 28, 1998.

(51) Int. Cl.[7] ..................................................... B64G 1/24
(52) U.S. Cl. ............................................. 701/13; 701/226
(58) Field of Search .................................. 701/3, 13, 226, 701/207, 208, 222; 244/158 R, 164, 171; 342/357.15

(56) References Cited

U.S. PATENT DOCUMENTS

| | | | |
|---|---|---|---|
| 5,043,737 | * 8/1991 | Dell-Imagine | 342/358 |
| 5,077,561 | * 12/1991 | Gorton et al. | 342/359 |
| 5,267,167 | * 11/1993 | Glickman | 701/226 |
| 5,909,381 | * 6/1999 | Shome et al. | 395/500.27 |
| 6,085,128 | * 7/2000 | Middour et al. | 701/13 |
| 6,089,507 | * 7/2000 | Parvez et al. | 244/158 R |

FOREIGN PATENT DOCUMENTS

08262119A * 10/1996 (JP).

* cited by examiner

*Primary Examiner*—Michael J. Zanelli
*Assistant Examiner*—Eric M Gibson
(74) *Attorney, Agent, or Firm*—Madson & Metcalf

(57) ABSTRACT

The invention incorporates an eccentric conformance module that determines time and position for a satellite. The eccentric conformance module eliminates the necessity of computing an eccentric anomaly for non-circular orbits by relying on a comparison of a circular orbit and application of a general power equation. The eccentric conformance module produces coordinates in a reference frame relating to an eccentric conformance model. The invention resolves these coordinates through transformation to a common reference frame by computing the transformation between the conformance displacement angle and the true anomaly. Calculations derived from the eccentric conformance module are applicable for ground-based and space-based systems. Applications include determination of line-of-sight pointing for antennas and predictions of satellite positions for intercept or rendezvous transfers and for safe orbit trajectories. All such computations are simplified with the use of the eccentric conformance method.

20 Claims, 11 Drawing Sheets

A Simple Constellation

A Conceptual Intercept Orbit

Two-Body Polar Coordinate System

Triangle Corresponding to Eq. (18)

Linear Elliptic Trajectory Model

Conformance Model for Elliptic Orbits

Conformance Model for Hyperbolic Orbits

Dynamic Hyperbolic Conformance Model

General Parabolic Orbit Model

ECCENTRIC CONFORMANCE, SATELLITE-POSITION DETERMINATION MODULE

RELATED APPLICATIONS

This application claims priority to provisional patent application Ser. No. 60/072,810 filed on Jan. 28, 1998.

BACKGROUND

1. The Field of the Invention

This invention relates to a system and method for determining the position of a satellite relative to time.

2. The Background Art

Satellite technology has revolutionized the modern world and provided numerous benefits to society in commerce and science. With additional advancements in technology, society's dependence on satellite technology grows. An efficient and well maintained satellite network is essential to the advancement of modern society.

A necessity of satellite technology is the ability to determine the position of a given satellite at particular times. This is critical to maintain accurate positions data on thousands of satellites in orbit. Furthermore, telecommunication and telemetry systems require precise knowledge of satellite positions in order to enable transmissions. Time-motion relationships are required in order to determine intercept or rendezvous orbits for satellites and other spacecraft.

Systems that determine a satellite's position require several parameters characterizing the satellite's orbit, including radius, eccentricity, and orbit type. Circular orbits provide uniform angular velocity. A time-position solution is a straightforward calculation. All other orbits may be defined as conic sections with non-zero values of eccentricity.

A computer program may execute a sequence of calculations to approximate the time-position relationships of satellites by incorporating a parameter called the "eccentric anomaly." Numerical methods (e.g., the Newton-Raphson method of successive approximations) are required to converge on a solution. To determine a satellite's coordinates at any given time requires substantial computational capacity. The computational demands become overwhelming when orbital data from hundreds or thousands of satellites must be computed to ensure a safe trajectory for a satellite.

Thus, it would be an advancement in the art to provide a faster, reliable, sifficiently accurate method for determining satellite position. More efficient convergence would reduce processing time.

BRIEF SUMMARY AND OBJECTS OF THE INVENTION

An apparatus and method in accordance with the invention provides a unique system to determine an orbiting satellite's position as a function of time using hardware or software and a simplified equation set. The invention may be incorporated into a software module or apparatus to be used as part of a pointing, tracking, or navigation system. The invention may serve both ground-based and orbit-based applications.

The invention incorporates an eccentric conformance module that determines time and position for each satellite. The eccentric conformance module eliminates the necessity of computing the conventional eccentric anomaly for non-circular orbits. Calculating orbital motion based on a straightforward comparison with a circular orbit requires or relies on the application of a general power equation. This eccentric conformance method applies to variables, equations, and entire models developed to eliminate the eccentric anomaly calculations.

The eccentric conformance module produces coordinates in a reference frame relating to an eccentric conformance model. The invention resolves these coordinates through transformation to a common reference frame by computing the transformation between the conformance displacement angle and the true anomaly.

The invention uses the calculations derived from the eccentric conformance module for ground-based and space-based system applications. These applications include determination of line-of-sight pointing for antennas and predictions of satellite positions for intercept or rendezvous transfers and for safe orbit trajectories. All such computations are simplified with the use of the eccentric conformance method.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

It will be readily understood that the components of the present invention, as generally described and illustrated in the Figures herein, could be arranged and designed in a wide variety of different configurations. Thus, the following more detailed description of the embodiments of the system and method of the present invention, as represented in FIGS. 1–11, is not intended to limit the scope of the invention, as claimed, but is merely representative of certain presently preferred embodiments of the invention.

The invention provides a unique system and method to determine an orbiting satellite's position as a function of time with simplified steps based on conformance rules. The invention may be incorporated into a software module or apparatus to be used as part of a pointing, tracking, or navigation system.

Figure 1:
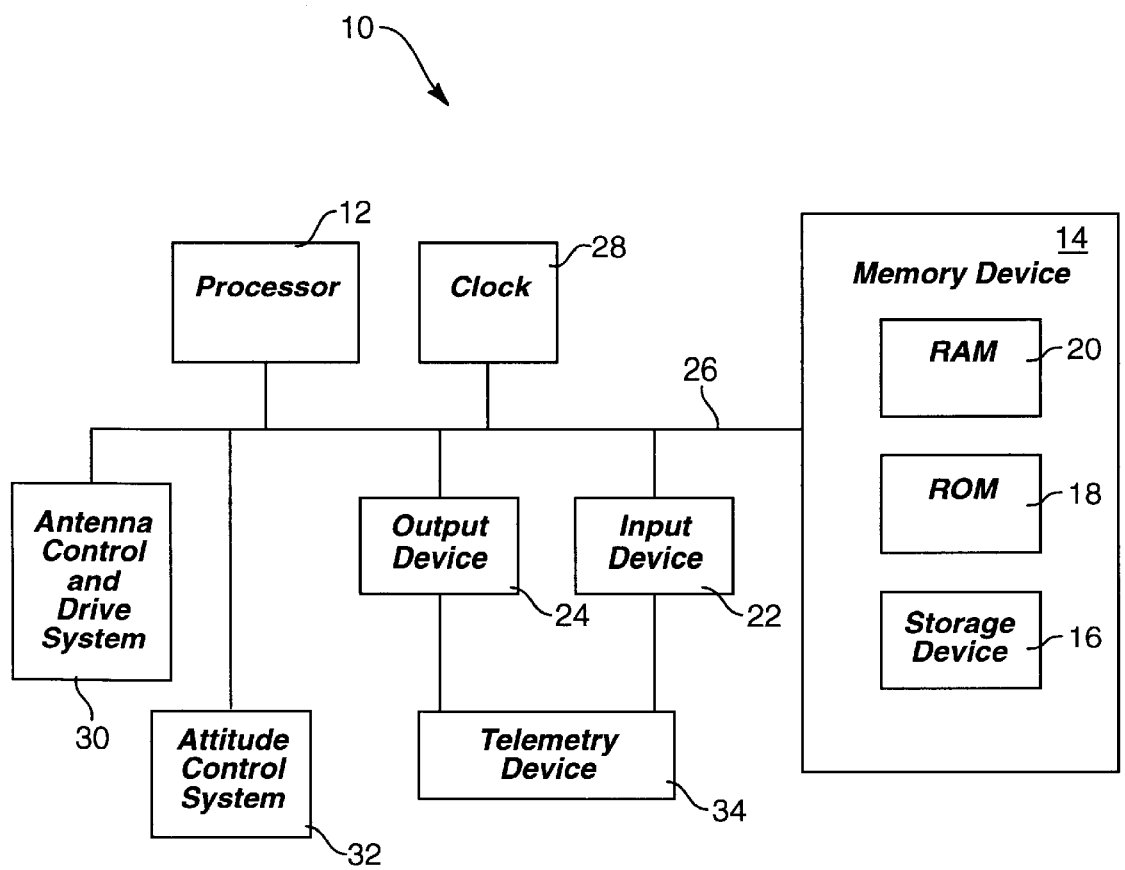
FIG. 1 is a schematic block diagram of one embodiment of an architecture of a system configured in accordance with the invention.

Referring to FIG. 1, a computer system 10 is capable of implementing the methods of the present invention. The computer system 10 is contemplated for both ground based and orbit based applications. The computer system 10 comprises a processor 12 or CPU 12 which is operably connected to a memory device 14. The processor 12 executes algorithms to determine the orbit position of a satellite as described herein.

A memory device 14 may include one or more devices such as a hard drive or non-volatile storage device 16, a read-only memory 18 (ROM) and a random access (and usually volatile) memory 20 (RAM).

The computer system 10 may include an input device 22 for receiving inputs from a user or another device. An input device 22 may include one or more physical embodiments. For example, a keyboard may be used for interaction with the user, as may a mouse or stylus pad. A touch screen, a telephone, or simply a telephone line, may be used for communication with other devices, users, or the like. Similarly, a scanner may be used to receive graphical inputs which may or may not be translated to other character formats. A memory device of any type (e.g. hard drive, floppy, etc.) may be used as an input device, whether resident within the system 10. The input device 22 allows data relating to new satellites to be added to the set, additional identification of the satellite to be tracked, and updates to satellite orbital parameters.

The system may also comprise an output device 24. The output device 24, like the input device 22, may include one or more physical hardware units. A monitor may provide outputs to a user for feedback during a process, or for assisting two-way communication between the processor 12 and a user. A printer or a hard drive may be used for outputting information as the output device 24.

Internally, a bus 26 may operably interconnect the processor 12, memory devices 14, input device 22, and output device 24. The bus 26 may be thought of as a data carrier. As such, the bus 26 may be embodied in numerous configurations. Wire, fiber optic line, wireless electromagnetic communications by visible light, infrared, and radio frequencies may likewise be implemented as appropriate for the bus 26.

The system 10, may further comprise a conventional clock 28 to maintain the internal timing of the system 10.

The system 10 may further comprise an antenna control and drive system 30 in operable connection with the processor 12. The antenna control and drive system 30 enables movement and orientation of a connected antenna (not shown). Thus, the computer system 10 may direct the antenna as needed to enable communication with a satellite.

The system 10 may further comprise an attitude control system 32 in electrical communication with the processor. The attitude control system 32 is incorporated into embodiments wherein the system 10 is based on board a satellite. The attitude control system 32 supports system control of the satellite attitude. The attitude control system 32 senses and controls rotation of the satellite relative to a frame of reference, such as a parent body. Attitude control systems 32 suitable for use with the invention are well known in the art.

The system 10 may further comprise a telemetry device 34 in communication with the input and output devices 22, 24. The telemetry device 34 enables transmissions to remote locations to provide long distance communication.

Figure 2:
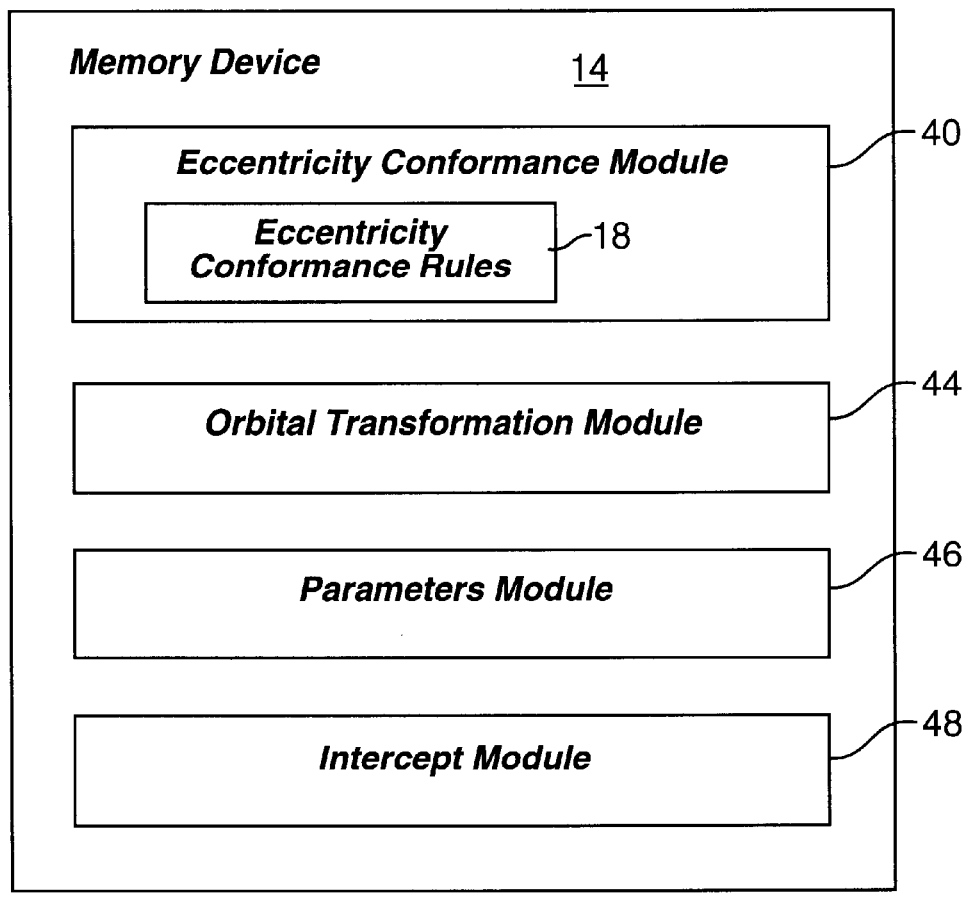
FIG. 2 is a structure diagram illustrating data structures of the storage device of the present invention.

Referring to FIG. 2, executable and non-executable (operational) data structures may be stored in a computer-readable medium. The computer-readable medium may be selected from one or more memory device 14, including the storage device 16, ROM 18, or parallelising RAM 20. The computer-readable medium may also be a peripheral floppy disk or compact disk accessed through the processor 12. Other forms of computer-readable media known by those of skill in the art may also be used and are included within the scope of the invention. One skilled in the art will appreciate that portions of the data structures may be stored in various computer-readable media such as the storage device 16, ROM 18, RAM 20, floppy disk, compact disk, tape, or the like. In one presently preferred embodiment, the data structures are stored in the memory device 14 of a single conputer.

The memory device 14 stores an eccentric conformance module 40 for execution by the processor 12. The eccentric conformance module 40 provides algorithmic instructions to execute the eccentric conformance method for calculating satellite coordinates. The term "eccentric conformance" may be generally applied to variables, equations, and models developed as the basis for eccentric conformance module calculations. Each orbit is represented by algorithms that model equations of motion unique to a type of orbit. These algorithms determine orbital position as a function of time, and the orbital parameters (e.g. Keplerian elements) define the orbit and the calculated position.

The eccentric conformance method is defined herein as calculating relative orbital motion and relating all motion to that of circular orbits to thereby avoid the eccentric anomaly approach. The eccentric conformance method further includes application of a power equation to the relative orbit. The power equation reflects the change of energy resulting from a change of a radius from that of a truly circular orbit. The power relationship of the relative orbit is expressed by linear parabolic motion. The resulting equations for each relative orbit are integrated to produce eccentric conformance rules. The complete set of two-body orbital motion eccentric conformance rules, all derived by integration of equations representing fundamental principles of mechanics, is displayed in Table 1. The nomenclature for the parameters used in the eccentric conformance rules is as follows:

$a$=semi-major axis
$e$=eccentricity
$p$=semi-latus rectum
$r$=radius
$t$=time
$E$=specific mechanical energy
$\epsilon$=elliptic displacement angle
$\eta$=hyperbolic displacement angle
$\mu$=gravitational constant
$\theta$=true anomaly, inertial displacement angle.

The derivation process providing the eccentric conformance rules is described in detail below. The eccentric conformance rules apply to two-dimensional problems, since each orbit is planar. Extending the solution to three dimensions is merely an application of classical mechanics and coordinate transformations that are in use in existing systems designed to model orbital motion.

Each eccentric conformance rule that includes the parameter a has been written to show a direct relationship with the motion equations of the circular orbit of radius a. The linear parabolic orbit is unique in its simplicity and has no angular dependency. The linear parabolic orbit relates to other orbits if the value of $r_0$ is selected as the value of a in the orbit of interest.

Elliptic and hyperbolic orbits have transcendental motion equations in the form shown in Table 1. However, the algebraic form of the linear parabolic equations permits them to be simplified with the application of the principle of special relativity. By a proper selection of a constant of integration, the linear parabolic orbit degenerates to a circular orbit and serves as a reference orbit to simplify the elliptic or hyperbolic equation.

TABLE 1

Summary of Eccentric Conformance Rules

| Orbit Type | Conservation of E and h (a) | Time-Displacement Relationship (b) | Angle Definition (c) | Eq. No. |
|---|---|---|---|---|
| Circle | $\sqrt{\dfrac{\mu}{a^3}} = \dot{\theta}_c$ | $\sqrt{\dfrac{\mu}{a^3}}\, t = \theta_c$ | $\theta$ = true anomaly | 1 |
| Linear Elliptic | $\sqrt{\dfrac{\mu}{a^3}} = \dfrac{r}{a}\dot{\varepsilon}$ | $\sqrt{\dfrac{\mu}{a^3}}\, t = \varepsilon - \sin\varepsilon$ | $\varepsilon = \cos^{-1}\dfrac{a-r}{a}$ | 2 |
| General Elliptic | $\sqrt{\dfrac{\mu}{a^3}} = \dfrac{r}{a}\dot{\varepsilon}$ | $\sqrt{\dfrac{\mu}{a^3}}\, t = \varepsilon - e\sin\varepsilon$ | $\varepsilon = \cos^{-1}\dfrac{a-r}{ae}$ | 3 |
| Linear Hyperbolic | $\sqrt{\dfrac{\mu}{a^3}} = \dfrac{r}{a}\sec\eta\,\dot{\eta}$ | $\sqrt{\dfrac{\mu}{a^3}}\, t = \tan\eta - \ln(\sec\eta + \tan\eta)$ | $\eta = \cos^{-1}\dfrac{a}{a+r}$ | 4 |
| General Hyperbolic | $\sqrt{\dfrac{\mu}{a^3}} = \dfrac{r}{a}\sec\eta\,\dot{\eta}$ | $\sqrt{\dfrac{\mu}{a^3}}\, t = e\tan\eta - \ln(\sec\eta + \tan\eta)$ | $\eta = \cos^{-1}\dfrac{ae}{a+r}$ | 5 |
| Linear Parabolic | $\sqrt{\mu} = \sqrt{\dfrac{r}{2}}\dot{r}$ | $\sqrt{\dfrac{\mu}{r_0^3}}\, t = \dfrac{\sqrt{2}}{3}\left(\left(\dfrac{r}{r_0}\right)^{3/2} - 1\right)$ | N/A | 6 |
| General Parabolic | $\sqrt{\mu} = \dfrac{r\dot{r}}{\sqrt{2r-\rho}}$ | $\sqrt{\dfrac{\mu}{p^3}}\, t = \dfrac{1}{6}\tan^3\theta/2 + \dfrac{1}{2}\tan\theta/2$ | $\theta = \cos^{-1}\dfrac{p-r}{r}$ | 7 |

In Table 1, note that a ± sign may be assumed to precede all equations in columns (a) and (b); equations in column (b) result from separating variables and integrating equations in column (a); and constants of integration are not shown except for the linear parabolic orbit.

Conformance rules for elliptic and hyperbolic orbits are expressed in terms of conformance angular displacement angles that must be converted to the conventional angle θ, the true anomaly. The calculations for these conversions are performed in the orbital transformation module. It is necessary to transform the true anomaly to the appropriate conformance angle before time-displacement calculations are performed. The following equations are used for this transformation:

$$\text{Elliptic orbits} \quad \cos\varepsilon = \frac{e + \cos\theta}{1 + e\cos\theta}$$

$$\text{Hyperbolic orbits} \quad \sec\eta = \frac{2 - e^2 + e\cos\theta}{e + e^2\cos\theta}$$

After the time-displacement calculations are performed using the eccentric conformance rules, it is necessary to transform back into the true anomaly for subsequent calculations involving orbital position. The following equations are used:

$$\text{Elliptic orbits} \quad \cos\theta = \frac{\cos\varepsilon - e}{1 - e\cos\varepsilon}$$

$$\text{Hyperbolic orbits} \quad \cos\theta = \frac{(2 - e^2)\cos\eta - e}{e^2 - e\cos\eta}$$

By avoiding calculations of eccentric anomaly, the eccentric conformance method greatly reduces computation requirements over conventional methods. The eccentric conformance method has applications for ground-based systems and space-based systems. Determinations of line-of-sight pointing for antennas, sensors or other devices are simplified with the use of the eccentric conformance method. Predictions of satellite positions at future points in time are also simplified, giving quick and accurate solutions to rendezvous and intercept problems.

The memory device 14 further stores an orbital transformation module 44 for calculating relationships between different orbital planes, and a common reference frame such as an Earth-centered coordinate system. Parameters are often given in a common reference frame in relation to a parent body, such as the earth. Thus, the orbital transformation system transforms parameters from a common reference frame to an eccentric conformance model as used by the eccentric conformance module 40.

Coordinates are produced by the eccentric conformance module 40 in relation to the eccentric conformance model. The orbital transformation module 44 serves to transform coordinates produced by the eccentric conformance module 40 to common reference coordinates. The orbital transformation module 44 resolves common reference frame coordinates through transformation between the conformance displacement angle and the true anomaly. Transformations are well known in the art for parameters of a satellite and the position of a satellite in its respective orbit.

Parameters relating to the satellite and the parent body, such as the semi-major axis, eccentricity, radius, gravitational constant, and satellite vector states are stored in a parameter module 46. These parameters may include all standard Keplarian elements for satellite coordination analysis. The parameters are retrieved from the parameter module as required by the eccentric conformance module 40 and the orbital transformation module 44. Various methods for obtaining the above listed parameters relating to a satellite and a parent body are well known in the art.

In one embodiment, fixed parameters such as the gravitational constant, the coordinates of the ground station, and Earth's rotation rate may be stored in the ROM 18. The RAM 20 may contain unique parameters for each satellite, such as eccentricity, semi-major axis, gravitational parameters, and state vectors. All such parameters are retrievable to support a problem solution (algorithm execution) by the processor 12 and may be updated as required.

The memory device 14 may further comprise an intercept module 48. Upon receiving coordinates from two different satellites and determining the orbital paths of the satellites, the intercept module 48 derives an intercept coordinate. Methods for determining an intercept coordinate of two satellites are known in the art.

In a method in accordance with the invention, coordinates of a satellite may be determined from the parameters relating to the satellite and the parent body, received in the parameter module 46. These typically include, the semi-major axis, eccentricity, gravitational constant, and a satellite vector state. Based upon these parameters, an orbit type may be determined. Determination of an orbit type is well known in the art and may be performed by the orbital transformation module 44 as well as by the eccentric conformance module 40.

The parameters are then transformed by the orbital transformation module 44 to parameters suitable for use in an eccentric conformance model. The eccentric conformance module 40 reviews the parameters and applies the appropriate eccentric conformance rule relating to the orbit type. The eccentric conformance module 40 then produces coordinates of the satellite relating to the eccentric conformance model. The orbital transformation module 44 then transforms the coordinates to common-reference-frame coordinates.

Alternatively, the orbital transformation module 44 may output the pointing vector parameters for a connected antenna. The antenna may then be directed by the antenna control and drive system 30 to an appropriate orientation.

The invention may be used in concert with comparatively accurate pointing systems in ground-based applications or with a stabilized orbiting platform in a satellite application. It may also be used in conjunction with a satellite tracking computer system in which a large number of orbiting bodies must be accounted for at any given time. These applications may be performed in conjunction with the architecture and data structures illustrated in FIGS. 1 and 2.

Figure 3:
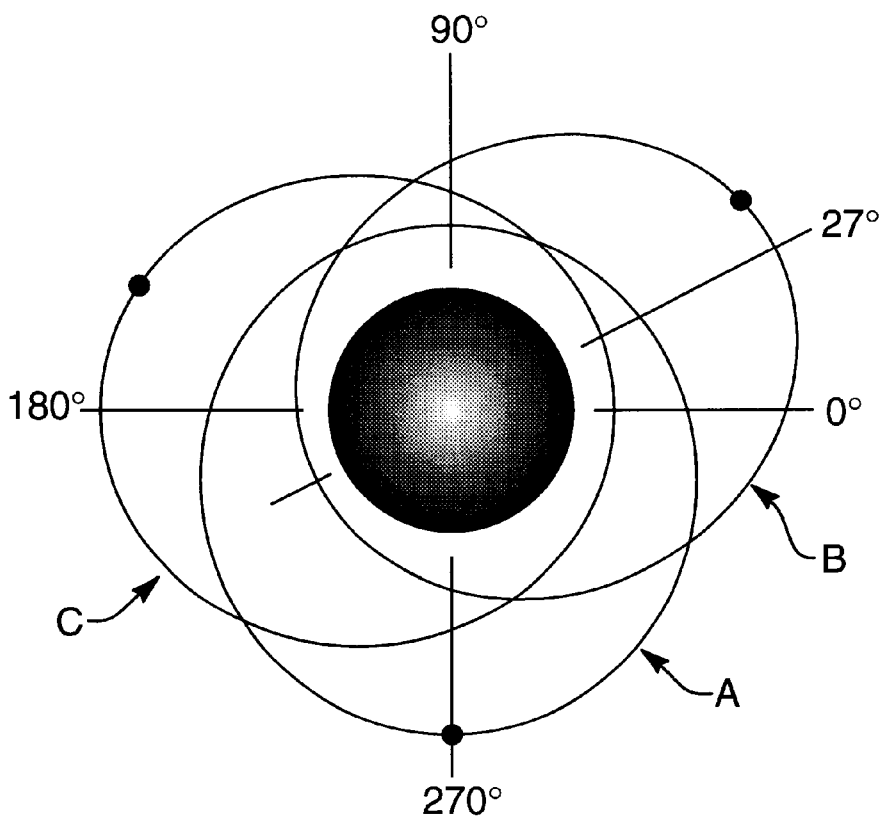
FIG. 3 is an orbit diagram.

The invention is applicable to passive tracking of one or many satellites, such as those illustrated in FIG. 3, to provide predictions of their simultaneous positions. This serves to ensure correct information (e.g. is the path clear?) for a spacecraft trajectory, to avoid satellite collisions, or to predict atmospheric reentry. Satellites that may be tracked include those with orbits in different planes, having different periods and of different orbit types.

The invention is further applicable to active tracking of one or more satellites. In this application, a laser or microwave beam is directed at the satellite for communication. When the position of a satellite orbit is known and defined by the parameters with respect to a ground station, a pointing angle may be determined for an antenna directed at the satellite. The invention is able to determine the satellite's orbital position through use of the eccentric conformance module 40. Transformation equations known in the art solve the remainder of the problem. Determining the satellite's orbital position with precession allows for greater security by alleviation of the frequency allocation problem. Transmissions are secure, with higher transmission rates. This application may support a constellation (e.g. geostationary) of satellites or many satellites in different, crossing orbits.

Similar to the ground based system, the invention is suitable for use as part of an on-board satellite computer system to track a set of satellites. By determining the coordinates of each satellite, parameters that define a vector that points from one satellite toward another may be readily derived as known in the art. Resulting coordinate vectors may be used to direct beams or instruments toward each satellite in the set from a master satellite or between satellites in the set at a given time.

A laser or microwave communications beam is an example application. A narrow beam offers limited opportunity for unwanted interception of the signal and a high data rate with power efficiency. However, a narrow beam transmission requires precise pointing accuracy and precise determination of the position of each satellite. Thus, the invention provides the benefit of increased accuracy by providing satellite coordinates in an efficient and accurate manner.

The invention may be used to determine intercept coordinates from one satellite to another. The intercept module 48 determines an orbit (or family of orbits) via which a satellite may transfer to an intercept or rendezvous point with a second satellite. The conformance rules 42 allow a simultaneous solution of a common position of the two satellites at the same time more directly and quickly. This improves over the prior art, which requires seeking numerical solutions to the intercept and the target orbit simultaneously, and then converging on a solution.

Given the coordinates of first and second satellites, the intercept module 48 is able to establish the parameters of a transfer orbit that will transport the first satellite to a point of intercept with a second satellite. The orbital transformation module 44 assists in this process by computing the transformation for each of the orbits to a common reference frame and computes the transformation between the conformance displacement angle and the true anomaly for each orbit.

Figure 4:
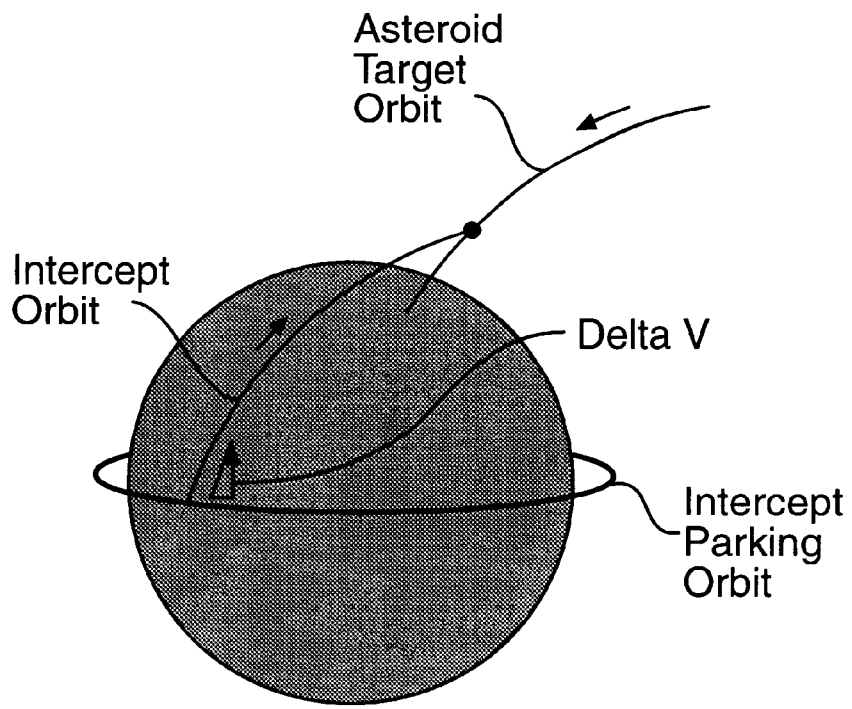
FIG. 4 is an orbit diagram illustrating an intercept orbit.

The intercept module 48 can determine the solution as a function of time for the intercept or initiation of the transfer orbit. The intercept module 48 can also determine a family of solutions that may apply over a span of time. The intercept module 48 determines the delta velocity vector that is required for transfer orbit insertion, satellite attitude, and the time for the firing signal. Given the satellite coordinates and an intercept coordinate, these calculations are well known in the art. The computer system 10 receives the transfer orbit parameters and calculates firing attitude parameters based on attitude data from the attitude control system 32. Referring to FIG. 4, a conceptual orbit diagram with a delta velocity (propulsive action) to insert the satellite into the intercept orbit is shown.

The invention is further applicable for powered orbit navigation of a satellite. A typical orbital transfer is accomplished through impulsive burns of the propulsion system that are quite short in duration. For many orbital transfer trajectory calculations, the assumption of an instantaneous delta velocity is acceptable, and accomplished by patched conic sections. When a significant radius change takes place during the propulsion system burn for orbital transfer, the satellite has a more difficult calculation to determine its flight during the propulsion interval.

The eccentric conformance module 40 provides a means of simplifying continuous calculations to determine the change in the orbit's energy and eccentricity to achieve the desired maneuver. The computer system 10 makes periodic coordinate calculations to assess the trajectory during the powered orbital transfer. Continuous adjustments may be made in satellite attitude to adjust or compensate for variation in propulsion system performance or attitude. These continual adjustments enable mission controllers to optimize the trajectory during the powered portion of flight. The computer system 10 defines transfer orbit parameters and calculates firing attitude parameters based on attitude data from the attitude control system 32. The input and output devices 22, 24 can be used to control propulsion system parameters and, in turn, the computer system 10 output to time/position relationships in the transfer orbit.

Derivation of Eccentric Conformance Rules

Two bodies interacting through the force of gravity between them are treated as a simple mechanical system. Two-body orbits analyzed with application of fundamental principles of classical mechanics conform to a universal power equation. Integration of this equation with respect to time is unique for each of the conic sections yielding different equations of motion for each type. The elliptic and hyperbolic equations are expressed as functions of conformance displacement angles that result naturally from the integration. Linear motion for trajectories with elliptical energy levels is considered first to present the approach with a limited variable set. Integration for general elliptic and hyperbolic orbits is then presented. Orbital motion is displayed in conformance models that have a dynamic mode that is validated by demonstrating compliance with the principle of conservation of energy. All of the derived orbital motion equations may be expressed as functions of circular orbital motion providing a foundation for a relative orbital motion analysis.

The scientific explanation of orbital motion developed in the seventeenth century is generally applied today. Equations of motion are based on Kepler's and Newton's laws with dependency on the demonstrated geometry of orbital paths, conic sections. A common step is that of stating the applicability of $$r = \frac{p}{1 + e \cos \theta} \quad (8)$$

as the general conic section equation written in polar coordinates. However, Eq. (8) has no solution for p=0, and therefore includes only orbital paths with non-zero values of angular momentum. Linear trajectories are omitted. Orbits with straight line trajectories, though not common, are real and should be expected to be included in a general solution.

Limitations are encountered when the true anomaly is selected as the displacement angle and integrated equations are sought to express orbital time-displacement relationships for eccentric orbits. Sweeping out equal areas in equal times is a manifestation of conservation of angular momentum given by $$h = r^2 \dot{\theta} \quad (9)$$

where h is constant. An attempt to separate variables and integrate this gives $$\int h dt = p^2 \int \frac{d\theta}{(1 + e \cos \theta)^2} \quad (10)$$

This does not give a satisfying result except for the case of the parabolic orbit (e=1). The classical approach relies on geometric relationships that conform to Kepler's second law and introduces the eccentric anomaly as a means of simulating this integration. This approach and Kepler's equation are classical as the foundation for deriving orbital time-displacement relationships. Two pertinent points are made regarding Kepler's method for the ellipse which has served as the pattern for the other orbits:

1. Limiting the integration step to consideration of conservation of angular momentum omits other applicable principles.
2. Restricting variables to a predetermined set (specifically θ) limits the result.

A Classical Mechanics Foundation

There are indications in the literature of interest in examining two-body orbital motion by analogy with rigid body dynamics. Junkins and Turner reported on results achieved in work on a U.S. Navy contract that focused on developing this analogy. They wrote of contributions to equations of motion that further the demonstrated relationships between the dynamics of deformable gyroscopic systems and orbital mechanics. It has also been shown that an orbit may be modeled as a gyroscope for a plane change maneuver. If the result of the propulsive force is equated to a pure torque on the system (no orbital energy change), then the resulting precession of the spin axis gives exactly the same plane change as the more typical velocity vector solution. The orbital system responds as a simple mechanical system.

Orbital mechanics clearly lies entirely within the domain of mechanics, and neither a departure from principles of classical mechanics nor the requirement for special explanations should be expected. This concept is explored in this paper. The motivation is based on the observation that an a priori condition of rotational motion has become fundamental to the derivations of equations of orbital motion and the contention that a more general representation is available and has value.

The approach presented derives equations of motion from basic principles of classical mechanics without incorporating relative area diagrams. It describes general motion, including linear orbital motion, and derives the expected principle of conservation of energy which serves as validation. The equations also demonstrate the familiar conic section relationships. Moreover, the set of derived equations includes the singularity that is evident at the apex of the cone, and this offers an important datum for further analysis.

The two-body orbit is treated as a simple mechanical system beginning with fundamental force, torque, and momentum relationships. A two-body orbit power equation is written. It integrates uniquely for each conic section to give energy equations, and again to give time-displacement equations. Polar orbit functions and displacement angles are defined that result naturally from the integration.

Fundamental Equations of Motion

Two bodies interacting with their mutual gravitational force will each be attracted toward the other in accordance with Newton's universal law. The magnitude of the force is expressed as $$F = \frac{\mu}{r^2} \quad (11)$$

Figure 5:
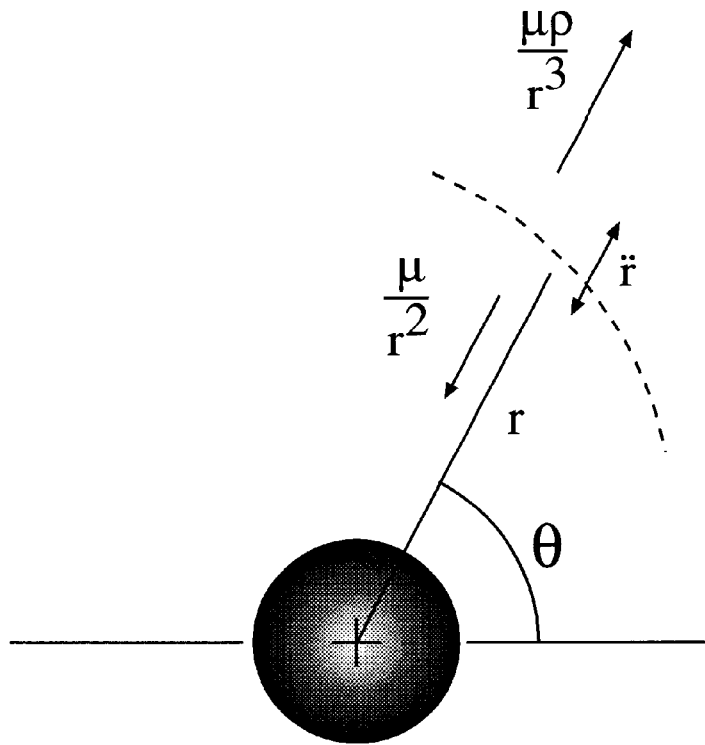
FIG. 5 shows a two-body polar coordinate system.

The mass of the satellite is unity, and $\mu$ is the gravitational constant for the parent body. FIG. 5 shows a two-body system sketch with polar coordinates. With gravity as the primary force present, acting along the line between the two bodies, torque on the system is zero. It follows that angular momentum, h, is constant and motion is planar. A polar coordinate reference system may be selected within that plane with its origin at the center of gravity of the parent body.

A satellite has two resultant forces which must be considered in the force analysis. The first is the centrifugal force acting outward opposing the gravitational to force. Kepler's laws and Eq. (8) address only those orbits with a rotational component, and the literature has been developed with a general implied assumption that all orbits have this force component. It is zero for linear orbits. Finally an inertial force associated with the acceleration and mass of the orbiting body is considered. It exists for all except circular orbits, and it acts in the direction that opposes acceleration in the r direction.

Another assumption implied by the literature should be addressed. Eq. (8) and FIG. 5 typically measure angular displacement relative to a polar coordinate reference frame that is fixed relative to inertial space, or to the stars. Related defined quantities, such as the eccentric anomaly angles, are measured with respect to the same reference frame. It is advantageous to relax the adherence to this single reference frame concept, and consider that others might be analytically useful.

Principles that apply to rigid body rotation have application in orbital motion analysis. The moment of inertia, typically a property of a rigid body relative to the axis of rotation, also applies to the system under consideration. With respect to the axis of rotation, moment of inertia is defined as $$I = \int r^2 dm \quad (12)$$

In this case a single body (the satellite) determines the moment of inertia, mass is constant, and $I = r^2\dot{\theta}$. Specific angular momentum is the product of moment of inertia and $\dot{\theta}$, or $h = r^2\dot{\theta}$.

Radial acceleration, $\ddot{r}$, is the response to the vector sum of centrifugal force due to rotational motion, $r\dot{\theta}^2$, and gravitational force of attraction, $\mu/r^2$, $$\ddot{r} = r\dot{\theta}^2 - \frac{\mu}{r^2} \quad (13)$$

The system described has no work crossing its boundaries, and power equals the work or energy change per unit time within the system. A general power equation results from multiplying each term in Eq. (13) by $\dot{r}$, the velocity aligned with the force direction, $$\ddot{r}\dot{r} = r\dot{r}\dot{\theta}^2 - \frac{\mu\dot{r}}{r^2} \quad (14)$$

Eq. (14) applies to general two-body orbital motion. Substituting the constant angular momentum value, $h = r^2\dot{\theta}$, into the second term and rearranging gives $$\ddot{r}\dot{r} - \frac{h^2\dot{r}}{r^3} + \frac{\mu\dot{r}}{r^2} = 0 \quad (15)$$

Integrating power with respect to time gives energy change or work performed, $$\frac{\dot{r}^2}{2} + \frac{h^2}{2r^2} - \frac{\mu}{r} = c_1 \quad (16)$$

The term $h^2/2r^2$ is equal to $r^2\dot{\theta}^2/2$ or the kinetic energy associated with the velocity component perpendicular to r. Adding this term to $\dot{r}^2/2$ gives the system kinetic energy. This plus potential energy equals total specific mechanical energy, E. Eq. (16) is the vis-viva equation representing conservation of energy for general orbital motion. Rewriting it with the substitution $h^2 = \mu p$, $$\varepsilon = \frac{\dot{r}^2}{2} + \frac{\mu p}{2r^2} - \frac{\mu}{r} \quad (17)$$

Linear Orbits

Though orbits in which a satellite moves directly toward or away from its parent body are not common, their somewhat simplified motion is analytically important. The linear trajectory power relationship is described by the general power equation, Eq. (15), with the second term eliminated, $$\ddot{r}\dot{r} = -\frac{\mu\dot{r}}{r^2} \quad (18)$$

Confirmation of the linear orbit condition is found in the literature. The eccentricity for any conic section may be expressed in terms of total energy and angular momentum, $$e = \sqrt{1 + \frac{2\varepsilon h^2}{\mu^2}} \quad (19)$$

Eq. (8) is typically considered to represent a parabolic orbit when $e=1$, and indeed, a parabolic orbit for which E is zero has an eccentricity of one. However, the eccentricity of elliptic and hyperbolic orbits with non-zero values of E may also be one when h is zero. This is the general condition for linear orbits.

Ellipse

Eq. (8) describes an ellipse in polar coordinates when the value of e is between zero and one, zero being the special case of a circle. Another special case, linear trajectories with total energy in the elliptical orbit range, is analyzed to present the approach with a limited variable set before general orbits are addressed.

Linear Trajectories

Eq. (18) is the general power relationship for satellite motion that is limited to a fixed radial path. Dividing both sides of this equation by the time increment gives an expression which can be integrated as force through a distance to give a work or energy change relationship $$\int \dot{r} d\dot{r} = -\mu \int \frac{dr}{r^2} \quad (20)$$

Integrating, $$\frac{\dot{r}^2}{2} = \frac{\mu}{r} + C_2 \quad (21)$$

This is the total energy equation for linear orbital motion in which the sum of kinetic and potential energies is constant. Velocity, $\dot{r}$, becomes zero at the maximum value of r, apoapsis.

Consideration of Eq. (8) at the limiting values of r shows that r varies between a(1−e) and a(1+e). Typically in the literature, a is stated to be undefined when e equals one. However, when cos θ is −1, r is equal to 2a. This is the point at which $\dot{r}$=0 and where the constant in Eq. (21) may be evaluated. It will be shown in the next section that this description is indeed valid because the derived equations for elliptical orbits are continuous from e=0 to e=1. For a given value of a. Eq. (21) becomes $$-\frac{\mu}{2a} = \frac{\dot{r}^2}{2} - \frac{\mu}{r} \quad (22)$$

Rearranging and taking the square root, $$\sqrt{\frac{\mu}{a}} = \pm \frac{r\dot{r}}{\sqrt{2ar - r^2}} \quad (23)$$

Separation of variables gives the following integral:

$$\sqrt{\frac{\mu}{a}} \int dt = \pm \int \frac{r \, dr}{\sqrt{2ar - r^2}} \quad (24)$$

For consistency with the equations for other orbits, the preferred form of Eq. (24) is $$\sqrt{\frac{\mu}{a}} \int dt = \pm \int \frac{r \, dr}{\sqrt{a^2 - (a-r)^2}} \quad (24a)$$

Considering the positive root and integrating with the substitution x=a−r gives $$\sqrt{\frac{\mu}{a}} t = -\frac{\sqrt{a^2 - (a-r)^2}}{a} + a \sin^{-1}\left(\frac{a-r}{a}\right) + C_3 \quad (25)$$

Figure 6:
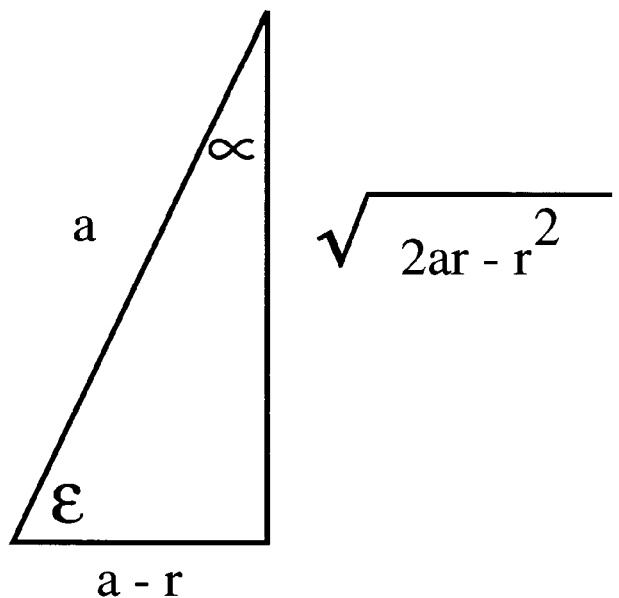
FIG. 6 shows a triangle illustrative of an equation.

The second term to the right of the equal sign suggests an angle relationship. Substituting an angle α for $$\sin^{-1}\left(\frac{a-r}{a}\right)$$

and considering the first term to the right of the equal sign, FIG. 6 may be constructed. A conformance variable may be defined that leads to a functional model, $$\varepsilon = \arccos\left(\frac{a-r}{a}\right) \quad (26)$$

Eq. (25) may then be written $$\sqrt{\frac{\mu}{a}} t = a\varepsilon - a\sin\varepsilon + C_3 \quad (27)$$

Figure 7:
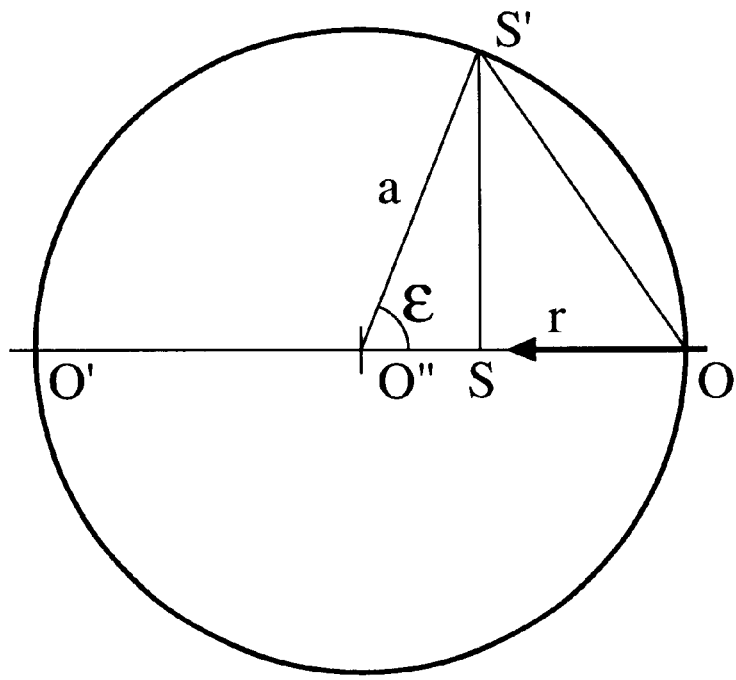
FIG. 7 shows a linear elliptic trajectory model.

FIG. 7 shows a polar coordinate model that conforms to Eqs. (26) and (27) with displacement expressed in terms of ε. With this model and selected derivations, the following equations then become evident:

$$\sqrt{\frac{\mu}{a}} = a\dot{\varepsilon} - a\cos\varepsilon\dot{\varepsilon} \quad (29)$$

$$\sqrt{\frac{\mu}{a}} = r\dot{\varepsilon} \quad (30)$$

Satellite motion which follows a straight line path is described by a circular component and a linear component. The constant $C_3$ in Eq. (27) may be evaluated by applying boundary conditions appropriate to the specific problem.

The model in FIG. 7 represents many variables, and it is dynamic. Each straight line may be multiplied by $\dot{\varepsilon}$ and have velocity characteristics with significance to the orbit. Consider the right triangle OSS'. The sides have the following values:

$$\overline{OS} = r \quad (32)$$

$$\overline{SS'} = a \sin \varepsilon = \sqrt{2ar - r^2} \quad (33)$$

$$\overline{OS'} = \sqrt{\sqrt{2ar}} \quad (34)$$

If each of these lines is multiplied by $\dot{\varepsilon}$, then squaring and dividing by two gives the following energy terms:

$$\frac{1}{2}(r\dot{\varepsilon})^2 = \frac{\mu}{2a} \quad (35)$$

$$\frac{1}{2}(a\sin\varepsilon\dot{\varepsilon})^2 = \frac{\dot{r}^2}{2} \quad (36)$$

$$\frac{1}{2}(\sqrt{2ar}\,\dot{\varepsilon})^2 = \frac{\mu}{r} \quad (37)$$

The sum of these values corresponds to the relationship between the sum of the squares of the sides of the OSS' triangle giving the conservation of energy equation, Eq. (22). Multiplying both sides of Eqs. (27) and (29) by α/2 gives an area rather than a line relationship. The area of FIG. 7 between the line and arc common to points O and S' increases (ascent) or decreases (descent) uniformly with time.

Eq. (17) represents elliptical orbits when the total energy, E, is equal to −μ/2α., eccentricity is less than one and h and p have non-zero values. Substituting and rearranging, $$\dot{r}^2 = \left(\frac{\mu}{a}\right)\frac{(2ar - r^2 - ap)}{r^2} \quad (38)$$

This may be rewritten with $p=a(1-e^2)$, $$\dot{r}^2 = \frac{\mu[a^2e^2 - (a-r)^2]}{ar^2} \tag{39}$$

Rearranging again and separating variables gives the following integration equation (positive root):

$$\sqrt{\frac{\mu}{a}} \int dt = \int \frac{rdr}{\sqrt{a^2e^2 - (a-r)^2}} \tag{40}$$

Integrating as in the previous section, $$\sqrt{\frac{\mu}{a}} t = -ae\frac{\sqrt{a^2e^2 - (a-r)^2}}{ae} + a\sin^{-1}\left(\frac{a-r}{ae}\right) + C_4 \tag{41}$$

With a similar angle substitution as in the linear orbit derivation, a similar solution is found. The general definition of $\epsilon$ is $$\varepsilon = \cos^{-1}\left(\frac{a-r}{ae}\right) \tag{42}$$

Eq. (41) then becomes $$\sqrt{\frac{\mu}{a}} t = a\varepsilon - ae\sin\varepsilon + C_5 \tag{43}$$

Figure 8:
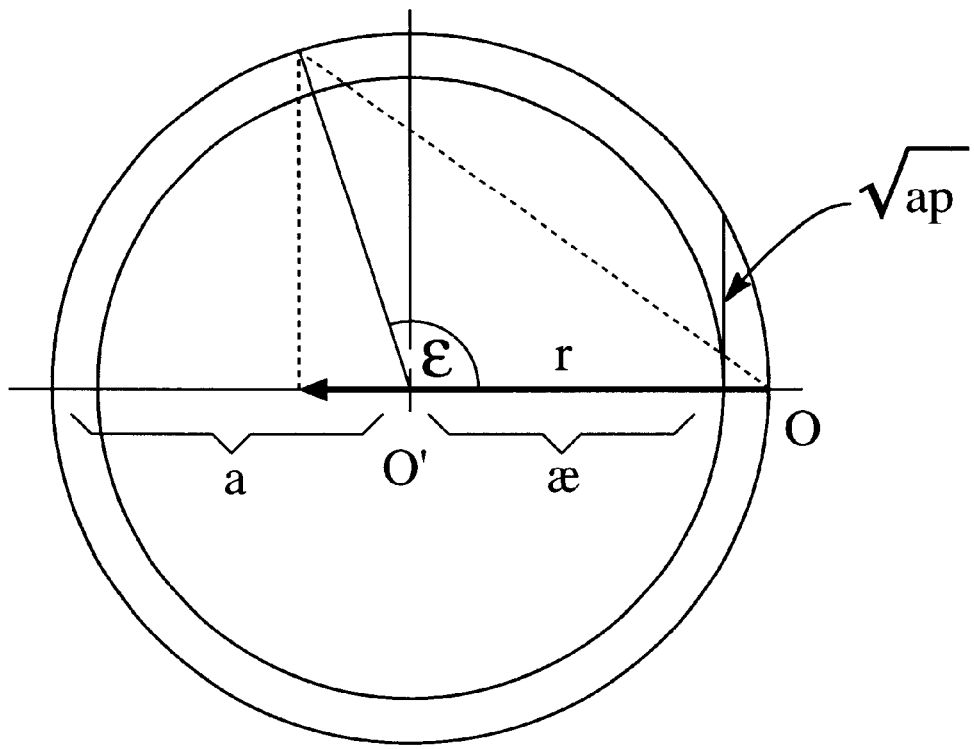
FIG. 8 shows a general elliptical orbit model.

FIG. 8 models general elliptical motion. It represents circular motion when e=0, and it simplifies to the model in FIG. 7 when e=1. It can be shown to be a valid representation of dynamic orbital relationships in the same manner as is the linear model. FIG. 8, Eqs. (42) and (43), and differentiation give the following relationships:

$$r = a - ae \cos \epsilon \tag{44}$$

$$\sqrt{\frac{\mu}{a}} = a\dot{\varepsilon} - ae\cos\varepsilon\dot{\varepsilon} \tag{45}$$

$$\sqrt{\frac{\mu}{a}} = r\dot{\varepsilon} \tag{46}$$

$$\dot{r} = ae \sin \epsilon \dot{\epsilon} \tag{47}$$

The constant $C_5$ in Eq. (43) may be evaluated by application of appropriate boundary conditions. Eq. (41) is mathematically identical to the equation involving the eccentric anomaly, E. However, the angle variables $\epsilon$ and E relate to the radius differently as noted in FIG. 8 and in an eccentric anomaly model. Note that the origin is on the circumference of the circle with radius a in FIG. 8.

Hyperbola

A satellite follows a hyperbolic path when its eccentricity is greater than one, total energy is positive, and h and p have non-zero values. Eq. (17) represents hyperbolic orbits when the total energy is $\mu/2\alpha$. Substituting and rearranging, $$\dot{r}^2 = \left(\frac{\mu}{a}\right)\frac{2ar + r^2 - ap}{r^2} \tag{48}$$

The substitution $p=a(e^2-1)$ will now be made and $\alpha$ will be introduced as a positive dimension. This is a departure from many approaches in the literature which treat a as negative for hyperbolic orbits. In the approach presented, a is treated as a physical dimension and need not change to a negative value as the sign of the total energy changes. The logic is validated by the vector resolution of the energy components in the dynamic model.

$$\dot{r}^2 = \left(\frac{\mu}{a}\right)\frac{(a+r)^2 - a^2e^2}{r^2} \tag{49}$$

Rearranging again and separating variables gives the following integration equation:

$$\sqrt{\frac{\mu}{a}} \int dt = \int \frac{rdr}{\sqrt{(a+r)^2 - a^2e^2}} \tag{50}$$

Integrating, $$\sqrt{\frac{\mu}{a}} t = ea\frac{\sqrt{(a+r)^2 - a^2e^2}}{ae} - a\ln\left(a + r + \sqrt{(a+r)^2 - a^2e^2}\right) + C_5 \tag{51}$$

Eq. (51) may be rewritten with the substitution of another conformance relationship, $$\eta = \cos^{-1}\frac{ae}{a+r} \tag{52}$$

and becomes $$\sqrt{\frac{\mu}{a}} t = ae\tan\eta - a\ln(\sec\eta + \tan\eta) + C_5 \tag{53}$$

or $$\sqrt{\frac{\mu}{a}} t = ae\tan\eta - a\ln\left[\tan\left(\frac{\pi}{4} + \frac{\eta}{2}\right)\right] + C_5 \tag{53a}$$

Figure 9:
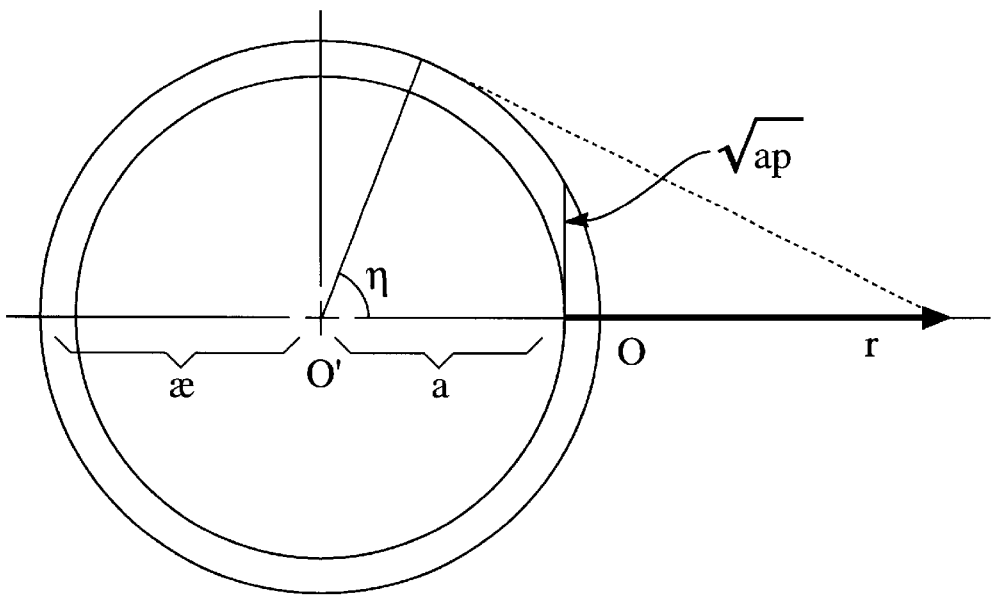
FIG. 9 shows a general hyperbolic orbit model.

The constant of integration, $C_5$, may be determined by selection of appropriate boundary conditions. A model that conforms to these equations is shown in FIG. 9. Consideration of the model and the equations, and differentiation gives the following relationships:

$$r = a\sec\eta - a \tag{54}$$

$$\sqrt{\frac{\mu}{a}} = ae\sec^2\eta\dot{\eta} - a\sec\eta\dot{\eta} \tag{45}$$

$$\sqrt{\frac{\mu}{a}} = r\sec\eta\dot{\eta} \tag{56}$$

Linear

A linear trajectory with its total energy level in the range of hyperbolic orbits is represented by the equations above when the eccentricity is one. The following equations apply:

$$r = a\sec\eta - a \quad (58)$$

$$\sqrt{\frac{\mu}{a}} = a\sec^2\eta\dot\eta - a\sec\eta\dot\eta \quad (59)$$

$$\sqrt{\frac{\mu}{a}} = r\sec\eta\dot\eta \quad (60)$$

$$\dot r = a\tan\eta\sec\eta\dot\eta \quad (61)$$

Figure 10:
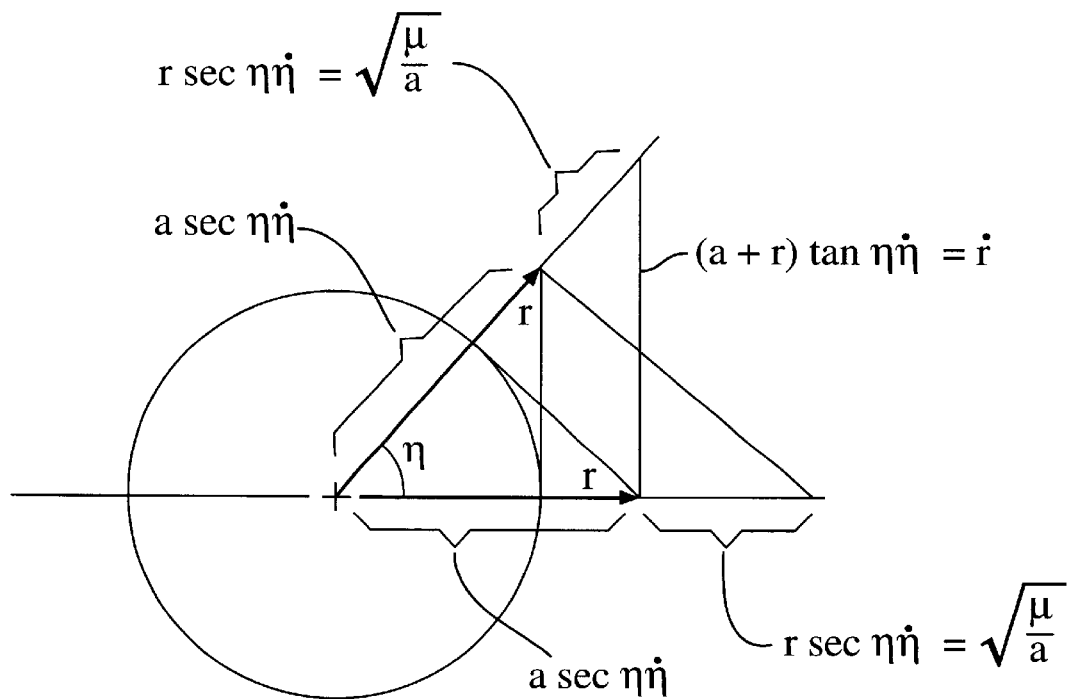
FIG. 10 shows a dynamic hyperbolic conformance model.
Figure 11:
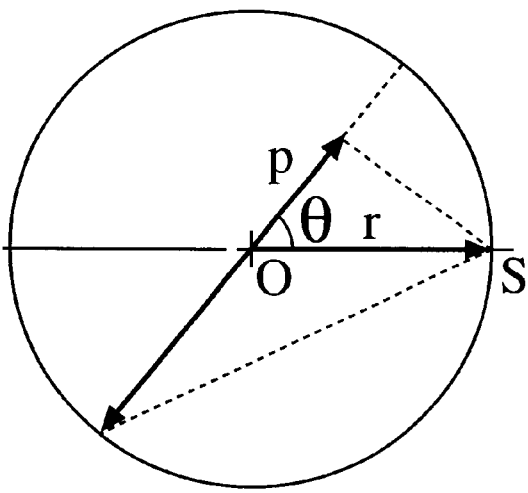
FIG. 11 shows a general parabolic orbit model.

Conservation of energy is apparent in the dynamic linear hyperbolic orbit model. As shown in FIG. 10. Multiplying all lines by $\dot\eta$ shows significant vector relationships. The sum of the squares of the OO"S" triangle produces the equation $$\dot r^2 = \left(a\sec\eta\dot\eta + \sqrt{\frac{\mu}{a}}\right)^2 - (a\sec\eta\dot\eta)^2 \quad (62)$$

Squaring and simplifying, $$\dot r^2 = 2a\sqrt{\frac{\mu}{a}}\sec\eta\dot\eta + \frac{\mu}{a} \quad (63)$$

Eq. (60) may be written $$\sec\eta\dot\eta = \sqrt{\frac{\mu}{a}}\frac{1}{r} \quad (64)$$

and with this substitution, Eq. (63) may be written $$\frac{\dot r^2}{2} - \frac{\mu}{r} = \frac{\mu}{2a} \quad (65)$$

This is the conservation of energy equation for a linear hyperbolic orbit. A similar relationship may be shown for the general hyperbolic model.

Hyperbolic Excess Velocity

As r approaches infinity and the potential energy approaches zero, kinetic energy approaches total energy. This is evident in FIG. 9. If Eqs. (56) and (57) are combined, $$\dot r = \frac{ae\tan\eta}{r}\sqrt{\frac{\mu}{a}} \quad (66)$$

Substituting Eq. (54) and rearranging, $$\dot r = \frac{e\sin\eta}{e - \cos\eta}\sqrt{\frac{\mu}{a}} \quad (67)$$

As $\eta$ approaches its limit of $\pi/2$, radial velocity approaches the constant hyperbolic excess velocity, $$\dot r \rightarrow \sqrt{\frac{\mu}{a}}$$

Parabola

A parabolic orbit has a total energy of zero and an eccentricity of one with non-zero values of h and p. It is unique in that velocity approaches zero as r approaches infinity, and the radius at periapsis is p/2. Substituting zero for E in Eq. (10) gives the equation for conservation of energy for parabolic orbits. Rearranging this result, $$\dot r^2 = \mu\left(\frac{2r - p}{r^2}\right) \quad (68)$$

Rearranging, separating variables and selecting the positive root gives the integral equation $$\sqrt{\mu}\int dt = \int\frac{rdr}{\sqrt{2r - p}} \quad (69)$$

Integrating, $$\sqrt{\mu}\, t = \frac{r + p}{3}\sqrt{2r - p} + C_6 \quad (70)$$

This relationship is simplified if t=0 at periapsis and $C_6$=0. Squaring both sides and rearranging, $$r^3 + \frac{3p}{2}r^2 - \left(\frac{p^3 + 9\mu t^2}{2}\right) = 0 \quad (71)$$

The model shown in FIG. 10 is constructed to satisfy Eq. (8) and the equations above.

An alternate form of the equation for r may be written in terms of $\theta/2$. From Eq. (8), $$r = \frac{p}{2}\sec^2\frac{\theta}{2} \quad (72)$$

Differentiating with respect to time, $$\dot r = p\sec^2\frac{\theta}{2}\tan\frac{\theta}{2}\frac{\dot\theta}{2} \quad (73)$$

Eq. (66), with the boundary condition t=0 at periapsis and the substitution of Eq. (68), may be written as $$\tan^3\frac{\theta}{2} + 3\tan\frac{\theta}{2} - 6\sqrt{\frac{\mu}{p^3}}\, t = 0 \quad (74)$$

An equation for expressing position as a function of time may be written for parabolic orbits by finding a real cubic solution for Eq. (67) or Eq. (74). Note that the same result may also be found by integrating the conservation of angular momentum equation with respect to time. Since $h = r^2\dot\theta$ the following integration equation may be written:

$$\sqrt{\mu p}\int dt = p^2\int\frac{d\theta}{(1 + \cos\theta)^2} \quad (75)$$

This equation integrates to give the same result as in Eq. (74).

Linear

A linear trajectory with kinetic energy equal to potential energy may be analyzed by repeating the steps for the general parabolic equation with p=0. Time is related to displacement by $$\sqrt{\mu}\,t = \frac{\sqrt{2}}{3} r^{3/2} + C_7 \tag{76}$$

The value of $C_7$ will depend on the conditions of the problem. Choosing $r=r_o$ when $t=0$, Eq. (76) may be rewritten to express position as a function of time:

$$r = \left(\frac{3}{2}\sqrt{2\mu}\,t + r_o^{3/2}\right)^{2/3} \tag{77}$$

Transformation

A conformance function has been developed for each of the families of elliptic and hyperbolic orbits and their corresponding coordinate systems. The transformation from displacement expressed in terms of $\epsilon$ to that of Eq. (8) is found by equating Eq. (8) to Eq. (44), $$\frac{p}{1+e\cos\theta} = a - ae\cos\varepsilon \tag{78}$$

Substituting $a(1-e^2)$ for p and rearranging, $$\cos\theta = \frac{\cos\varepsilon - e}{1 - e\cos\varepsilon} \tag{79}$$

Similarly, the corresponding transformation for hyperbolic orbits is found by equating Eq. (8) to Eq. (54) and making the substitution $p=a(e^2-1)$.
or $$\frac{p}{1+e\cos\theta} = ae\sec\eta - a \tag{80}$$

$$\cos\theta = \frac{e\cos\eta - 1}{e - \cos\eta} \tag{81}$$

or
Summary and Discussion

The integration approach to orbital motion analysis departs from the method involving the eccentric anomaly and treats the two-body orbit as a simple mechanical system. The derived equations of motion are listed in Table 1 above. The following results are attained with this approach:

A universal power equation for non-circular orbits
Unique equations of motion for each orbit type with conformance models that represent static and dynamic relationships for each orbit type
Simplified elliptic and hyperbolic orbit time-displacement equations with all equations expressed in trigonometric functions
An algebraic time-displacement equation for parabolic orbits (Kepler problem solution)

All equations of motion in Table 1 were integrated from a general power equation and derived with the application of fundamental principles of mechanics. Each equation that includes the parameter a has been written to show a direct relationship with the motion equations of the circular orbit with radius a. The linear parabolic orbit is unique in its simplicity and it has no particular value of $r_0$ that is advantageous as a boundary condition.

Time-Displacement Calculations
Elliptic Orbits

The power that relates the kinetic and potential energy levels in a linear parabolic orbit may be expressed as a function of time. When displacement for the linear parabolic orbit is mapped into the model for the elliptic orbit, energy exchange given by the linear parabolic equation as a function of time may be related to the energy transformation in the elliptic orbit. With reference to Table 1, Eq. (6b) may be mapped into the elliptic orbit model FIG. 8 with the appropriate substitution for $r_0$. If $r_0$ has the value of a, the Eq.(6b) may be rewritten as $$\sqrt{\frac{\mu}{a^3}}\,t = \frac{\sqrt{2}}{3}\left[\left(\frac{r}{a}\right)^{3/2} - 1\right] \tag{82}$$

When The linear parabolic equation is expressed in this way, all of the orbital motion equations in Table 1 have a function to the left of the equal sign that is directly related to the constant angular velocity of a circular orbit with radius a.

Hyperbolic Orbits

The linear parabolic orbit mapped into the model for a hyperbolic orbit permits derivation of the time-displacement for this orbit. FIG. 7 shows the model that coincides with the hyperbolic equations.

The equations presented in this section, or their derivatives, may be used in combination to show time-displacement in a radial or angular displacement function for an orbit of interest. Adjustments to initial conditions permits a choice of the epoch upon which calculations are based, such as periapsis passage.

Angle Transformations

Conformance functions for elliptic and hyperbolic orbits are expressed in terms of conformance angular displacement angles that may be converted to the conventional angle $\theta$, the true anomaly. The calculations for conversions between conformance angular displacement are performed in the angles and conventional angles SPODEM. The following equations will transform the true anomaly to the corresponding conformance angle:

$$\text{Elliptic orbits}\quad \cos\varepsilon = \frac{e+\cos\theta}{1+e\cos\theta} \tag{85}$$

$$\text{Hyperbolic orbits}\quad \sec\eta = \frac{2-e^2+e\cos\theta}{e+e^2\cos\theta} \tag{86}$$

The following equations will transform the conformance angle to the corresponding true anomaly:

$$\text{Elliptic orbits}\quad \cos\theta = \frac{\cos\varepsilon - e}{1 - e\cos\varepsilon} \tag{87}$$

$$\text{Hyperbolic orbits}\quad \cos\theta = \frac{(2-e^2)\cos\eta - e}{e^2 - e\cos\varepsilon} \tag{88}$$

The invention may be embodied in other specific forms without departing from its spirit or essential characteristics. The described embodiments are to be considered in all respects only as illustrative and not restrictive. Any explanations provided herein of the scientific principles employed in the present invention are illustrative only. The scope of the invention is, therefore, indicated by the appended claims rather than by the foregoing description. All changes within the meaning and range of the claims are to be embraced within their scope.

What is claimed is:

1. An apparatus for tracking a satellite, the apparatus comprising:
    a processor programmed to execute modules for processing orbit data corresponding to a first position of a first satellite to determine spatial coordinates therefor, the processor further programmed to execute an orbital transformation module;

a memory device operably connected to the processor for storing executable and operational data structures, the data structures comprising:

an eccentric conformance module, executable by the processor to apply conformance rules to produce first satellite coordinates as a function of time;

an orbital transformation module, executable by the processor to transform the satellite coordinates into common reference coordinates; and a parameter module containing the orbit data relating a first satellite position to a parent body position.

2. The apparatus of claim 1, further comprising an antenna control system operably connected to the processor to direct the position of an antenna to thereby control movement of the antenna in accordance with the common reference coordinates.

3. The apparatus of claim 1, further comprising an attitude control system operably connected to the processor to control a first satellite attitude.

4. The apparatus of claim 1, further comprising:

an input device operably connected to the processor for receiving orbit data;

an output device operably connected to the processor for providing common reference coordinates; and a telemetry system operably connected to the input and output devices for communicating the inputs to the processor and the outputs from the processor.

5. The apparatus of claim 1, wherein the processor is further programmed to determine a type of orbit path corresponding to the orbit data.

6. The apparatus of claim 1, wherein the orbit data indicates a common reference and the processor is further programmed to execute an orbital transformation module to transform the orbit data into conformance data and to provide the conformance data to the eccentric conformance module.

7. The apparatus of claim 1, wherein the processor is further programmed to execute the eccentric conformance module to determine second coordinates corresponding to a second position of a second satellite.

8. The apparatus of claim 7, wherein the processor is further programmed to provide an intercept trajectory from the first coordinates and second coordinates.

9. A method for tracking a position of a satellite, the method comprising:

receiving first orbit data corresponding to a first satellite;

providing the first orbit data to an eccentric conformance module, executable to apply conformance rules for producing first coordinates corresponding to a first position of a first satellite at a first time;

providing the first coordinates to an orbital transformation module, executable to transform the first coordinates to common reference coordinates reflecting the first position of a first satellite.

10. The method of claim 9 further comprising determining an orbital path corresponding to a first satellite and reflecting the first orbit data.

11. The method of claim 9 further comprising providing the first orbit data to the orbital transformation module to generate conformance data therefrom, the conformance data being processable by the eccentric conformance module.

12. The method of claim 9, further comprising providing second orbit data corresponding to a second satellite to determine second coordinates indicative of a second position corresponding to a second satellite at a second time.

13. The method of claim 12, further comprising determining an intercept trajectory corresponding to the first and second coordinates.

14. The method of claim 9, further comprising directing the position of an antenna in accordance with the common reference coordinates to enable transmission between the antenna and a first satellite.

15. A computer readable medium storing data structures for determining the position of a satellite orbiting a parent body, the data structures comprising:

an eccentric conformance module effective to apply conformance rules to first orbit data reflecting a first satellite position to a parent body position to produce first coordinates; and an orbital transformation module effective to transform the first coordinates to common reference coordinates.

16. The computer readable medium of claim 15 further comprising a parameter module containing the first orbit data indicative of a first satellite position to a parent body position.

17. The computer readable medium of claim 15, wherein the eccentric conformance module is effective to provide an orbital path of a first satellite based on the first orbit data.

18. The computer readable medium of claim 15, wherein the parameter orbital transformation module is effective to transform the first orbit data to conformance data and to provide the conformance data to the eccentric conformance module.

19. The computer readable medium of claim 15, wherein the eccentric conformance module is effective to process second orbit data indicative of a second position of a second satellite to provide second coordinates.

20. The computer readable medium of claim 19, further comprising an intercept module effective to determine an intercept trajectory of the first and second satellites from the first and second coordinates of the first and second satellites.

* * * * *

UNITED STATES PATENT AND TRADEMARK OFFICE
CERTIFICATE OF CORRECTION

PATENT NO. : 6,233,507 B1
DATED : May 15, 2001
INVENTOR(S) : Douglas H. May

It is certified that error appears in the above-identified patent and that said Letters Patent is hereby corrected as shown below:

Column 14,
Before line 24, please insert -- $\dot{r} = a \sin \varepsilon \, \dot{\varepsilon}$ (31) --.

Column 16,
Before line 64, please insert -- $\dot{r} = ae \tan \eta \sec \eta \, \dot{\eta}$ (57) --.

Column 20,
Line 33, after the word "displacement", please insert therefor
-- angles and conventional angles --.

Signed and Sealed this

Second Day of July, 2002

Attest:

Attesting Officer

JAMES E. ROGAN
Director of the United States Patent and Trademark Office